(12) United States Patent
Krywitsky

(10) Patent No.: US 8,833,448 B2
(45) Date of Patent: Sep. 16, 2014

(54) FLUID SYSTEM COMPONENT WITH SACRIFICIAL ELEMENT

(75) Inventor: Lee A. Krywitsky, Calgary (CA)

(73) Assignee: Hiltap Fittings, Ltd., Calgary, Alberta (CA)

( * ) Notice: Subject to any disclaimer, the term of this patent is extended or adjusted under 35 U.S.C. 154(b) by 431 days.

(21) Appl. No.: 13/074,773

(22) Filed: Mar. 29, 2011

(65) Prior Publication Data

US 2011/0259582 A1  Oct. 27, 2011

Related U.S. Application Data

(60) Provisional application No. 61/318,939, filed on Mar. 30, 2010, provisional application No. 61/419,002, filed on Dec. 2, 2010.

(51) Int. Cl.
| | | |
|---|---|---|
| E21B 47/06 | (2012.01) | |
| G01M 3/28 | (2006.01) | |
| F16K 17/16 | (2006.01) | |
| E21B 34/06 | (2006.01) | |

(52) U.S. Cl.
CPC ............ E21B 47/06 (2013.01); G01M 3/2853 (2013.01); F16K 17/16 (2013.01); G01M 3/2815 (2013.01); E21B 34/063 (2013.01)
USPC ....... 166/250.07; 166/376; 166/321; 166/317

(58) Field of Classification Search
USPC .............................. 166/250.07, 376, 321, 317
See application file for complete search history.

(56) References Cited

U.S. PATENT DOCUMENTS

| | | | |
|---|---|---|---|
| 1,814,800 A | | 7/1931 | Heeter |
| 3,055,424 A | | 9/1962 | Allen |
| 3,599,713 A | * | 8/1971 | Jenkins ......................... 166/368 |
| 3,994,338 A | | 11/1976 | Hix |
| 4,691,775 A | * | 9/1987 | Lustig et al. .................. 166/317 |
| 4,796,704 A | * | 1/1989 | Forrest et al. ................. 166/317 |
| 5,161,828 A | | 11/1992 | Hynes |
| 6,095,247 A | | 8/2000 | Streich |

(Continued)

FOREIGN PATENT DOCUMENTS

WO  WO2004/025160  3/2004

OTHER PUBLICATIONS

International Search Report for PCT/IB2003/004485 dated May 6, 2004.
U.S. Appl. No. 10/660,352, Apr. 1, 2005, Office Action.

(Continued)

*Primary Examiner* — Cathleen Hutchins
(74) *Attorney, Agent, or Firm* — Workman Nydegger

(57) ABSTRACT

A system for pressure testing the joints and walls of a production pipe includes a fluid system component that can be disposed at a first end of the production pipe so as to seal off the first end of the production pipe. The fluid system component prevents the flow of fluid out of the first end of the production pipe when the pressure within the production pipe is below a predetermined level. The fluid system component includes a sacrificial element that is adapted for preferential failure when the pressure within the production pipe exceeds the predetermined level. Upon failure of the sacrificial element, fluid is able to flow out of the production pipe through the fluid system component. The system may also include a test plug that prevents the activation of a drain component in the production pipe during the pressure testing of the production pipe.

21 Claims, 8 Drawing Sheets

(56) References Cited

U.S. PATENT DOCUMENTS

| | | |
|---|---|---|
| 6,397,950 B1 | 6/2002 | Streich |
| 6,497,285 B2 | 12/2002 | Walker |
| 6,672,389 B1 | 1/2004 | Hinrichs |
| 6,752,212 B2 | 6/2004 | Burris |
| 7,028,778 B2 | 4/2006 | Krywitsky |
| 7,267,178 B2 | 9/2007 | Krywitsky |
| 2004/0118566 A1* | 6/2004 | Krywitsky .................... 166/317 |

OTHER PUBLICATIONS

U.S. Appl. No. 10/660,352, Sep. 12, 2005, Office Action.
U.S. Appl. No. 10/660,352, Nov. 10, 2005, Notice of Allowance.
U.S. Appl. No. 11/254,636, Aug. 31, 2006, Office Action.
U.S. Appl. No. 11/254,636, Jan. 26, 2007, Notice of Allowance.

* cited by examiner

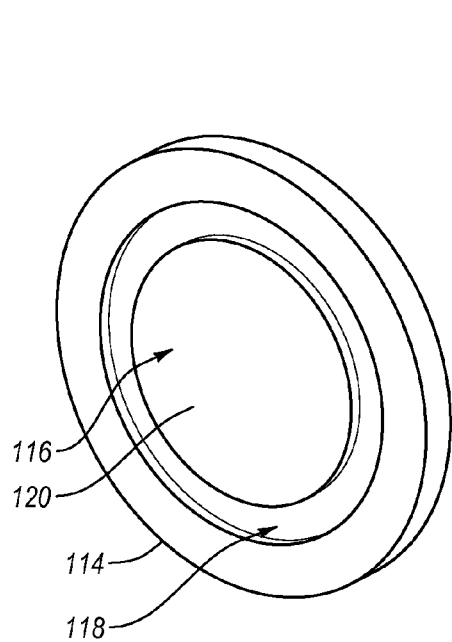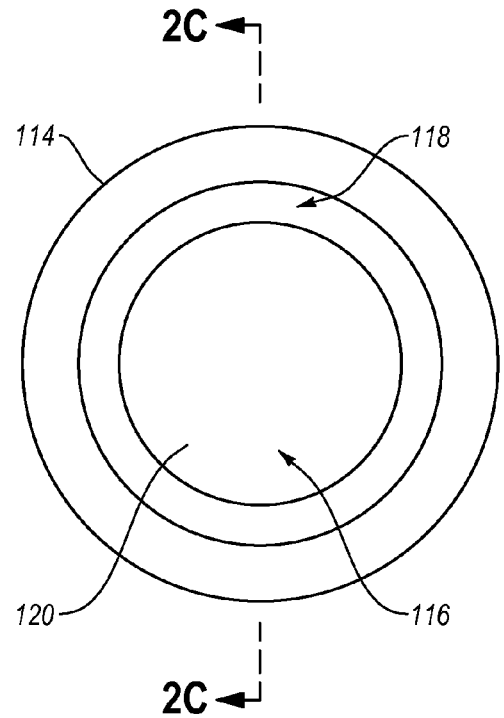
*Fig. 2A*    *Fig. 2B*
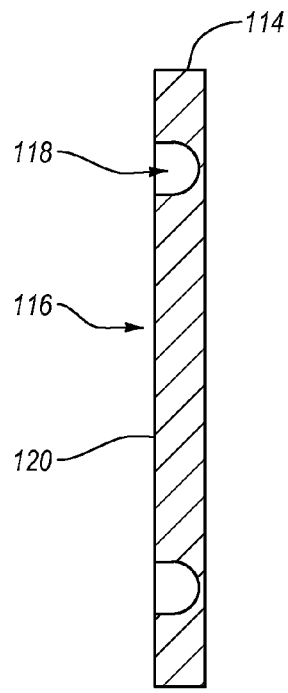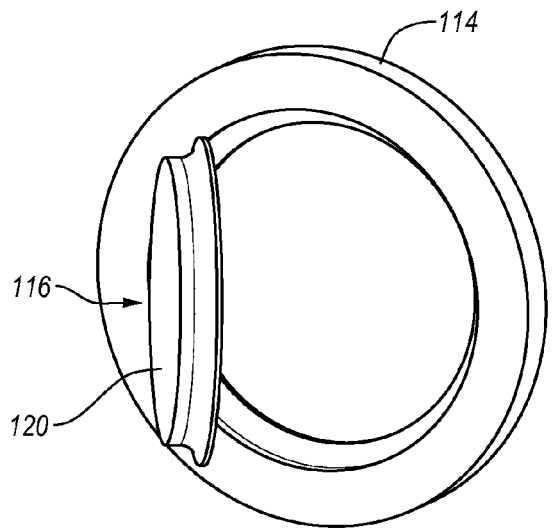
*Fig. 2C*    *Fig. 2D*

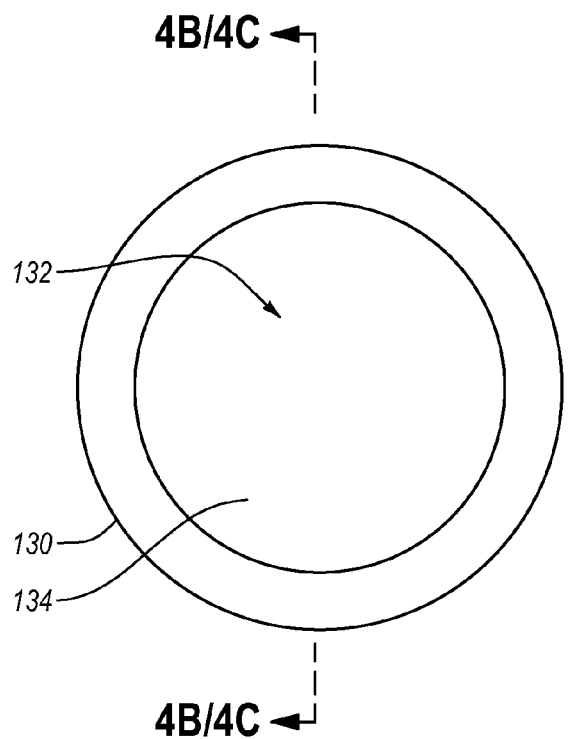
*Fig. 4A*
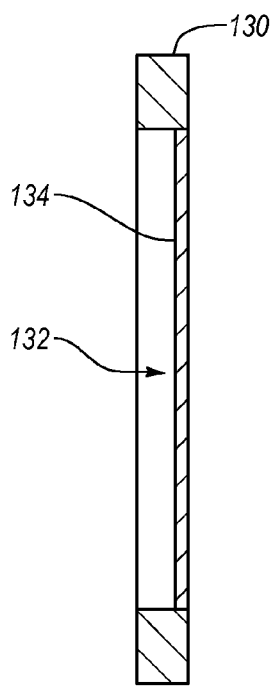 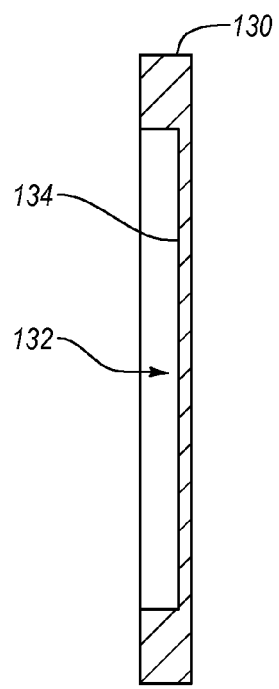
*Fig. 4B*          *Fig. 4C*

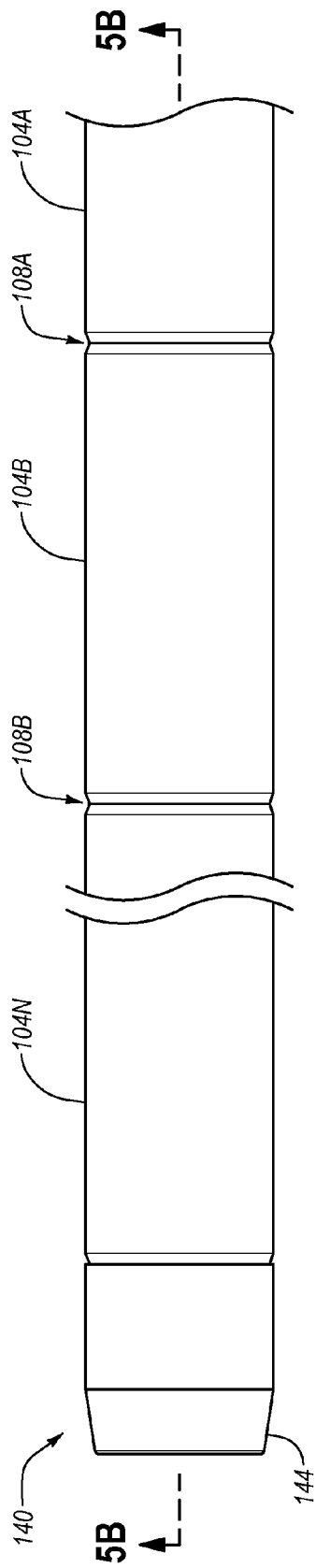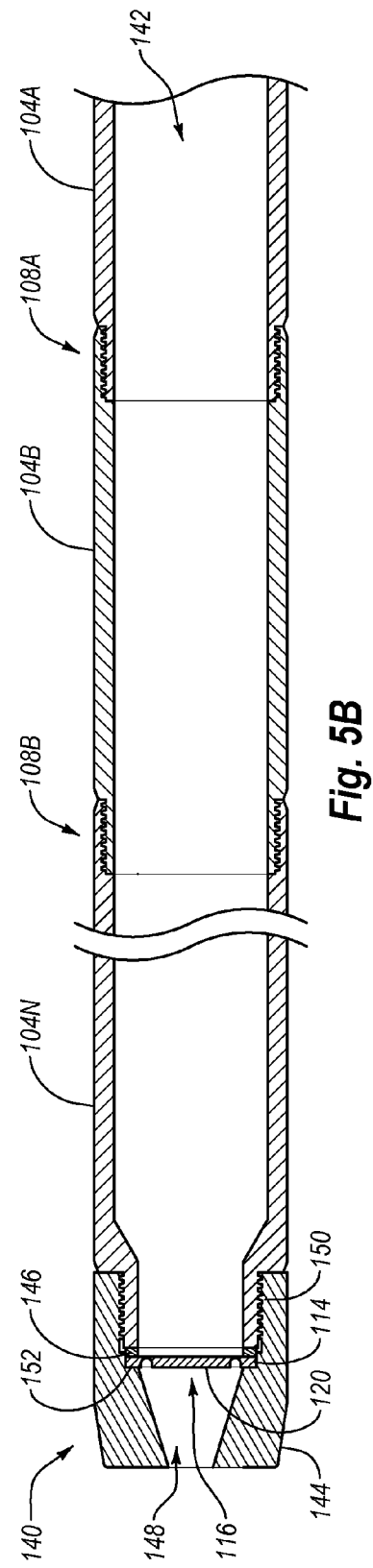
Fig. 5A
Fig. 5B

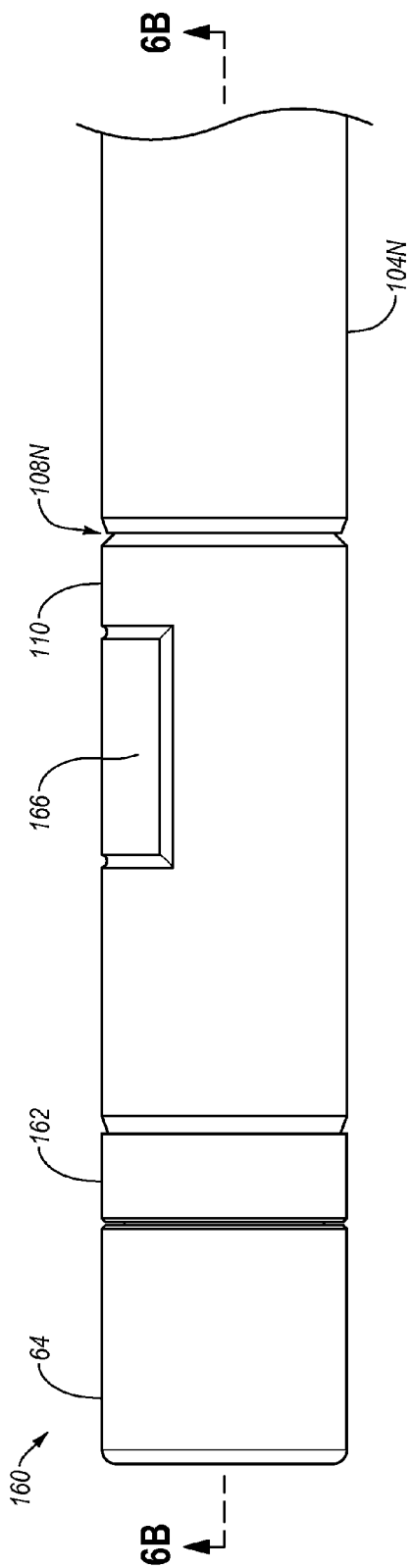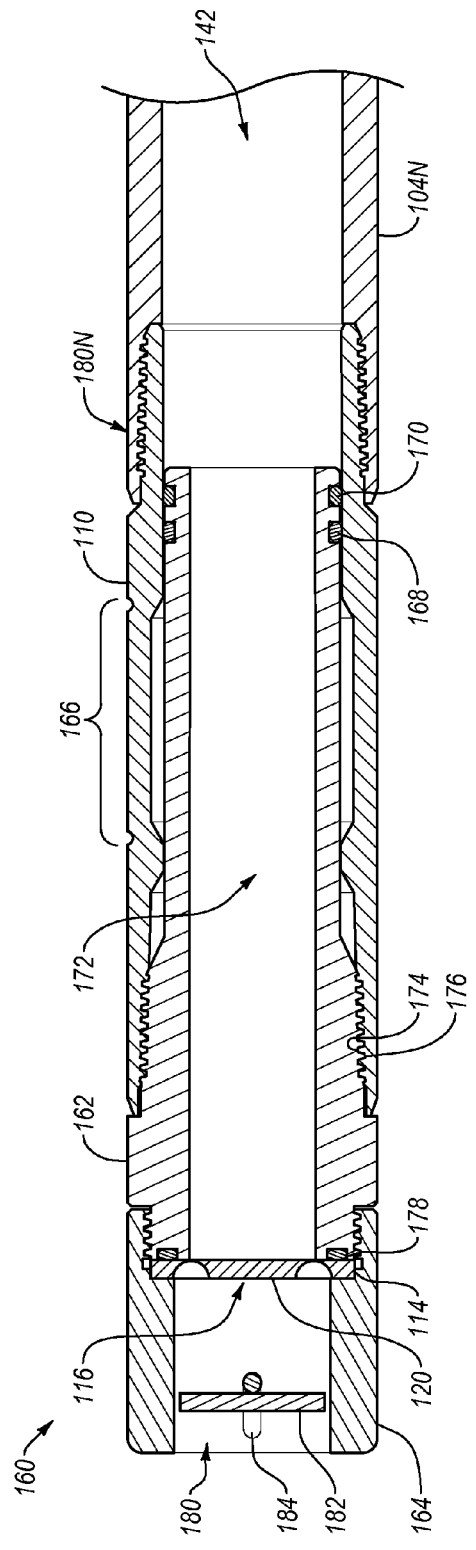

FLUID SYSTEM COMPONENT WITH SACRIFICIAL ELEMENT

CROSS-REFERENCE TO RELATED APPLICATIONS

This application claims priority to and the benefit of U.S. Provisional Patent Application Ser. No. 61/318,939, filed Mar. 30, 2010, entitled "FLUID SYSTEM COMPONENT WITH SACRIFICIAL BURST DISK," and U.S. Provisional Patent Application Ser. No. 61/419,002, filed Dec. 2, 2010, entitled "SACRIFICIAL BURST DISK FLUID SYSTEM COMPONENT," the disclosures of which are incorporated herein by this reference in their entireties.

BACKGROUND OF THE INVENTION

1. Technical Field

The present invention relates to methods and apparatus for testing the integrity of the walls and connecting joints of a tubing string to determine the presence of leaks in the pipe walls or joints prior to or after insertion of the tubing string into a bore hole.

2. The Relevant Technology

In typical oil and gas exploration efforts, an initial search is made to identify various geographical formations that are believed to be potential sources of a desired product. When such geographical formations have been located and identified, one or more exploratory wells are drilled in an effort to ascertain aspects such as the quantity, quality, and accessibility of any materials that may be present. Once it has been determined that it is economically viable to recover the discovered materials, a well, or well hole, is drilled in order to facilitate access to those materials.

After the well hole has been drilled, a casing is inserted into the ground and cemented in position in the well hole. Typically, the casing comprises a series of hollow members connected end to end in order to form the long, hollow casing pipe. After the casing has been secured in position, a production pipe or "string" of tubing is inserted down through the casing. Like the casing, the production pipe comprises a series of hollow members connected end to end in order to form the long, hollow production pipe that can extend downward into the reservoir or area where the gas, oil, or other materials are located. In some installations, the lower portion, or other selected portions of the production pipe are perforated so that the oil, gas, or other materials can flow into the production pipe and up to a wellhead connected to the production pipe and located at the surface. In many cases however, the natural pressure of the material desired to be recovered is not sufficient to ensure that the material flows to the surface at an adequate rate.

Accordingly, many gas and oil rigs and recovery systems include one or more well pumps, such as positive displacement pumps, configured and arranged to aid in moving the materials to the surface relatively more quickly. Typically, such well pumps include a pump discharge line, or other discharge connection, that is connected to the lower end of the production pipe. A check valve is provided in the pump discharge line so that backflow into the well pump from the discharge line and/or production pipe is prevented. The well pump further includes a suction connection to which is attached a suction line that extends into the reservoir or area where the gas, oil or other materials are located. In other cases, the well pump is a submersible type, so that the suction connection is submersed in the material to be pumped, and no suction line is required.

In operation, the well pump directs a flow of oil, gas or other materials into the production pipe after another pump located at the surface has cycled. Similar to the well pump, the surface pump may be a displacement type pump. When the gas, oil, or other material reaches the surface, those materials are then directed through a wellhead and into the production system.

Prior to beginning production through a production pipe, it is important to conduct pressure tests on the production pipe, including the pipe walls and all connection joints, to determine whether any leaks exist. If a leak exists at a joint between two sections of the production pipe, for example, the joint must be tightened, sealed, replaced, or otherwise repaired to ensure that the production pipe functions properly. Any such leaks in the production pipe need to be mended so that sufficient pressure can be maintained within the production pipe to allow the gas, oil, or other material to flow up to the surface without leaking out of the production pipe and into the casing.

The present invention provides methods, systems, and devices for quickly and reliably conducting pressure tests on production pipes either before or after the production pipes have been installed in a well basing. Nevertheless, the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide systems, methods, and devices for testing the integrity of the walls and connecting joints of a tubing string to determine the presence of leaks in the pipe walls or joints. For instance, according to one exemplary embodiment of the present invention, a fluid system component includes a disk that can be directly or indirectly secured to a first end of a fluid conduit. The disk prevents the flow of fluid out of the first end of the fluid conduit when a pressure within the fluid conduit is below a predetermined level. The disk includes a sacrificial element that is adapted for preferential failure when the pressure within the fluid conduit exceeds the predetermined level. In one embodiment, the sacrificial element is a window, defined by one or more grooves formed in a surface of the disk, that opens when the pressure within the fluid conduit exceed the predetermined level.

According to an exemplary method for pressure testing a production pipe, a production pipe is provided that includes a plurality of tubing sections joined together end-to-end. A fluid system component is provided that has a sacrificial element adapted to fail upon the application of pressure above a predetermined level. The fluid system component is disposed at a first end of the production pipe to seal the first end of the production pipe. The production pipe is then pressurized to a level below the predetermined level. The pressure within the production pipe is then increased above the predetermined level to cause the sacrificial element to fail, thereby releasing the pressure within the production pipe.

According to another exemplary embodiment, a pressure test assembly includes a test plug that is adapted to be received at least partially within a fluid conduit. The test plug has a fluid passageway extending therethrough. An end piece is adapted to be selectively secured to the test plug. The end piece has a channel extending therethrough. A fluid system component can be secured between the test plug and the end piece. The fluid system component has a sacrificial element. The sacrificial element prevents fluid communication between the fluid passageway in the test plug and the channel in the end piece when a pressure within the fluid conduit is below a predetermined pressure level. The sacrificial element also opens to allow for fluid communication between the fluid passageway in the test plug and the channel in the end piece when a pressure within the fluid conduit is above the predetermined pressure level.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 2A is a perspective view illustrating aspects of an exemplary implementation of a fluid system component with a sacrificial element;

FIG. 2B is an elevation view of the fluid system component of FIG. 2A;

FIG. 2C is a cross-sectional view of the fluid system component of FIG. 2A;

FIG. 2D is a perspective view of the fluid system component of FIG. 2A after the preferential failure of the sacrificial element;

FIG. 4A is an elevation view illustrating aspects of yet another exemplary implementation of a fluid system component with a sacrificial element;

FIG. 4B is a cross-sectional view of the fluid system component of FIG. 4A;

FIG. 4C is a cross-sectional view of a fluid system component similar to the fluid system component of FIG. 4A;

FIGS. 5A-5C illustrate elevation and cross-sectional views of an exemplary embodiment of a pressure test assembly associated with a production pipe;

FIGS. 6A and 6B illustrate elevation and cross-sectional views of another exemplary embodiment of a pressure test assembly associated with a production pipe.

DETAILED DESCRIPTION OF THE PREFERRED EMBODIMENTS

The embodiments described herein extend to methods, devices, systems, assemblies, and apparatus for quickly and reliably conducting pressure tests on production pipe tubing strings. Such are configured to, for example, reliably test the integrity of the walls and connecting joints of a tubing string to determine the presence of leaks in the pipe walls or joints prior to or after insertion of the tubing string into a bore hole and in a simple and efficient manner.

Reference will now be made to the drawings to describe various aspects of exemplary embodiments of the invention. It is understood that the drawings are diagrammatic and schematic representations of such exemplary embodiments, and are not limiting of the present invention, nor are any particular elements to be considered essential for all embodiments or that elements be assembled or manufactured in any particular order or manner. No inference should therefore be drawn from the drawings as to the necessity of any element. In the following description, numerous specific details are set forth in order to provide a thorough understanding of the present invention. It will be obvious, however, to one of ordinary skill in the art that the present invention may be practiced without these specific details. In other cases, well known aspects of fluid systems and methods, general manufacturing techniques, and fluid system components are not described in detail herein in order to avoid unnecessarily obscuring the novel aspects of the present invention.

FIGS. 1-7B and the following discussion are intended to provide a brief general description of exemplary devices, systems, and methods in which embodiments of the invention may be implemented. While fluid system components for use in pressure testing production pipes are described below, this is but one single example, and embodiments of the invention may be implemented in other types of systems.

Figure 1:
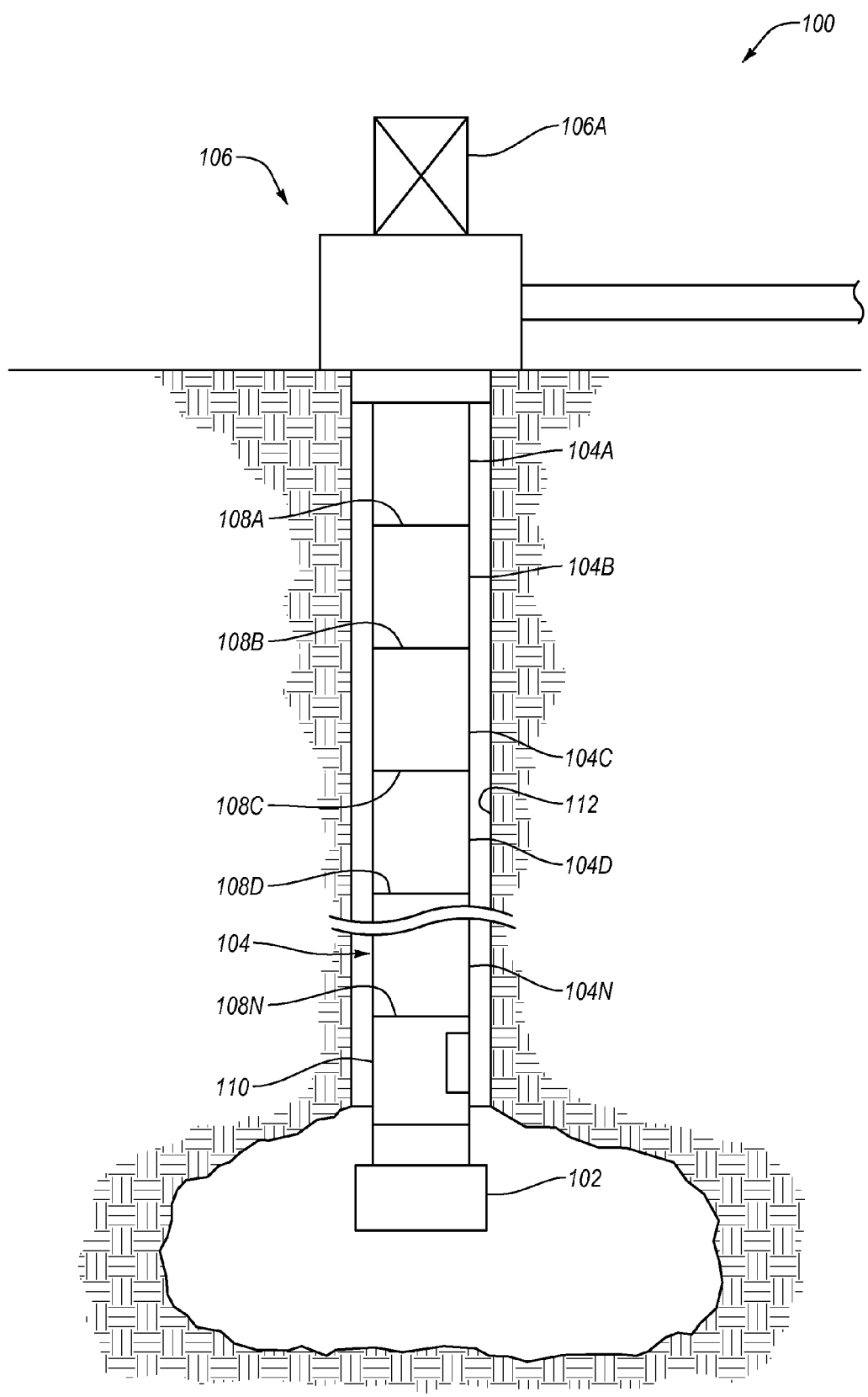
FIG. 1 is a schematic diagram illustrating aspects of an exemplary operating environment for embodiments of the invention, specifically, an oil or gas well.
Figure 3A:
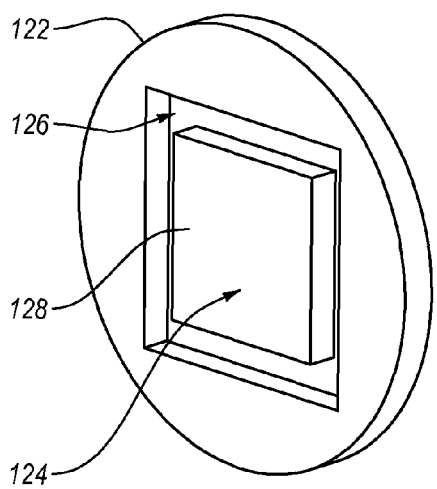
FIG. 3A is a perspective view illustrating aspects of another exemplary implementation of a fluid system component with a sacrificial element.
Figure 3B:
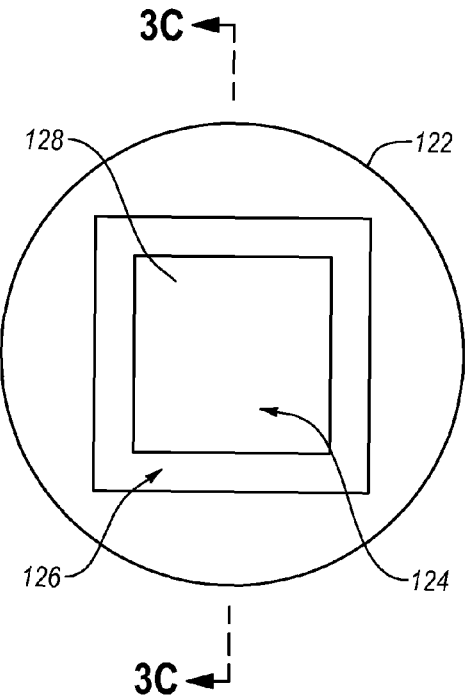
FIG. 3B is an elevation view of the fluid system component of FIG. 3A.
Figure 3C:
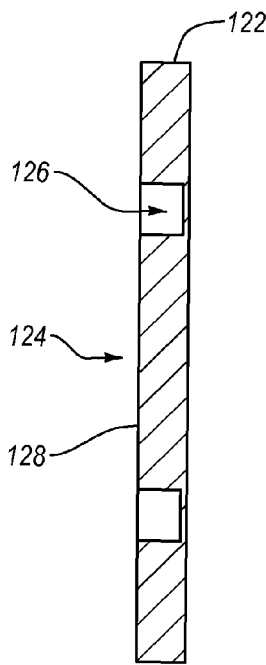
FIG. 3C is a cross-sectional view of the fluid system component of FIG. 3A.

With reference first to FIG. 1, details are provided concerning various aspects of an exemplary operating environment for at least some embodiments of the invention. Material recovery system 100 exemplarily comprises a gas or oil drilling and processing system. However, the scope of the invention is not so limited and embodiments of the invention may, more generally, be employed in any fluid system, or other application where the functionality disclosed herein may prove useful. In connection with the foregoing, it should be noted that as used herein, "fluid" refers broadly to gases, liquids, and combinations of gases and liquids, as well as to combinations of gases and solids, and combinations of liquids and solids.

With continuing reference to FIG. 1, material recovery system 100 includes a well pump 102 that is positioned proximate the underground formation containing the materials that are desired to be recovered. Well pump 102 includes pump suction and discharge connections and is exemplarily implemented as a positive displacement pump, such as a diaphragm pump or peristaltic pump. Well pump 102 may alternatively comprise another type of pump as well. In any case, well pump 102 includes a suction connection configured and arranged for fluid communication with the underground formation containing the materials to be recovered, as well as a discharge connection attached to, or otherwise arranged for fluid communication with a production pipe 104.

As indicated in FIG. 1, production pipe 104 extends up to the ground surface and terminates in a wellhead 106 that includes one or more well valves 106A that enable an operator to control the flow of materials from production pipe 104. Production pipe 104 is formed of several lengths or sections of pipe, identified as 104A-104N, that are connected together at joints 108A-N. In the Figures, joints 108A-N are illustrated as being threaded connections between adjacent sections 104A-N. This is but one example of how sections 104A-N may be connected together. One skilled in the art will readily recognize other types of connections that may be employed to join sections 104A-N together. Production pipe 104 may also include a pressure relief or drain component 110 as discussed in greater detail elsewhere herein.

Material recovery system 100 further includes a casing 112 that is cemented in position in a well hole and is configured to receive production pipe 104. In this arrangement, well pump 102 is located proximate the bottom of casing 112 and is configured for fluid communication with production pipe 104. In some implementations, production pipe 104 fits closely within the casing 112 so that production pipe 104 comes into contact with casing 112 as production pipe 104 is moved down through casing 112.

As discussed herein, it is important to conduct pressure tests on production pipe 104, including the walls of sections 104A-N and all connection joints 108A-N, to determine whether any leaks exist prior to beginning production through production pipe 104. If a leak exists at a joint 108 between two sections 104A-N of production pipe 104, for example, the leaky joint 108 must be tightened, sealed, replaced, or otherwise repaired to ensure that production pipe 104 functions properly. Any such leaks in production pipe 104 need to be mended so that sufficient pressure can be maintained within production pipe 104 to allow the gas, oil, or other material to flow up to the surface without leaking out of production pipe 104 and into casing 112.

The present invention allows for pressure testing of production pipe 104 either before or after production pipe 104 is installed in casing 112. This is advantageous for several reasons. For instance, pressure testing production pipe 104 before installation in casing 112 can be relatively quick and easy. The series of production pipe tubing sections 104A-N can be joined together to form long production pipe 104. With the present invention attached to or disposed within one end of production pipe 104, as discussed below, production pipe 104 can be tested to ensure that it is able to maintain the required amount of pressure and that no leaks exist in the walls or joints 108A-N of production pipe 104.

Alternatively, the present invention can be used to pressure test production pipe 104 after production pipe 104 has been installed in casing 112. That is, as discussed below, the present invention can be inserted into an installed production pipe 104 to enable pressure testing of the installed production pipe 104. More specifically, once the present invention is placed in the installed production pipe 104, the pressure testing can be performed in a similar manner as when performed on a production pipe 104 that has not been installed in well casing 112.

When employing the present invention during pressure testing of production pipe 104, either before or after installation of production pipe 104 in casing 112, the present invention seals off one end of production pipe 104 so that production pipe 104 can be filled with a fluid. With the present invention attached to or inserted into one end of production pipe 104, the fluid within production pipe 104 is pressurized to a predetermined level to ensure that production pipe 104 is able to maintain sufficient pressure to remove gas, oil, or other materials from the ground or sub-surface without leaking.

In many wells production pipe 104 must be able to maintain relatively high pressures in order to allow for the efficient removal of gas, oil, or other materials from the ground. The actual pressure that production pipe 104 must be able to maintain can depend on a variety of factors. These factors may include, among others, the age of the reservoir, the characteristics of the geological formations, the size/length of production pipe 104 and/or well casing 112, and the like. Additionally, as gases, oils, or other materials are pumped through production pipe 104, the weight of these materials creates pressures in the portions of production pipe 104 that are lower than these materials. Particularly in cases where production pipe 104 is quite long, the weight of these materials can create significant pressure on the lower portions of production pipe 104.

Some gases, oils, and other materials are quite viscous, making it more difficult to pump them through production pipe 104. As a result, higher pressures may be required to pump more viscous gases, oils, and other materials through production pipe 104. In such cases, production pipe 104 may need to be able to maintain a higher production pressure than in cases where the gases, oils, and other materials flow more readily.

As will be understood, the nature or characteristics of the gases, oils, or other materials being extracted from the reservoir may change over the life of the reservoir. For example, the gases, oils, or other materials near the top of the reservoir may flow more easily than the gases, oils, or other materials that are at the bottom of the reservoir. As a result, the pressure needed to pump the gases, oils, and other materials on the top of the reservoir may be lower than the pressure needed to pump the gases, oils, and other materials at the bottom of the reservoir. Likewise, the diameter and/or length of production pipe 104 and/or well casing 112 may affect the pressure levels used during productions.

In many wells production pipe 104 must be able to maintain pressures above 2000 psi in order to allow for the efficient removal of gas, oil, or other materials from the ground. For instance, a common production pressure in production pipe 104 is 2100 psi. Therefore, when pressure testing production pipe 104, the fluid within production pipe 104 is usually pressurized to at least to the pressure level that will be encountered during production. For example, if a certain well produces at 2100 psi, then when pressure testing production pipe 104, the fluid within production pipe 104 may be pressurized to at least 2100 psi. This ensures that production pipe 104 will be able to maintain adequate pressure from and including a pump seating nipple up to wellhead 106 during production.

In other cases, production pipe 104 may need to maintain pressures greater or less than 2000 psi. In those cases, production pipe 104 may then be pressure tested at pressures greater or less than 2000 psi. For instance, production pipe 104 may only need to maintain production pressures around 1000 psi. In that case, production pipe 104 may be pressure tested at about 1800 psi. In other cases, production pipe 104 may need to maintain pressures around 2800 psi, thereby requiring pressure testing at pressures at or above 2800 psi.

The foregoing pressure levels are merely exemplary. Production pipes 104 can be adapted to maintain production pressure levels suitable for specific well characteristics as discussed herein. Likewise, the present invention can be configured to facilitate pressure testing at any desired pressure level. Accordingly, the present invention can be configured to maintain pressure levels at least as great as any production pressure level that may be encountered by production pipe 104.

As discussed below, once the pressure testing of production pipe 104 is completed, the present invention allows for the ready release of the fluid from production pipe 104 and removal of the present invention from production pipe 104. This allows production pipe 104 to be more quickly readied for installation in casing 112 or, in the case of an already installed production pipe 104, the ability to more quickly and easily install a pump and begin production through production pipe 104.

As shown in FIGS. 2A-4C, embodiments of the invention generally concern a fluid system component that includes a sacrificial element configured and intended to fail upon the occurrence of certain predefined conditions such as, for example, a predefined pressure differential exerted upon the sacrificial element. More particularly, the failure of the sacrificial element is a selective, or preferential, failure in that the occurrence of the predefined condition causes the sacrificial element to fail, but the occurrence of such predefined condition typically does not cause the failure of other portions of the associated fluid system component.

With specific reference to FIGS. 2A-2D, a fluid system component 114 is illustrated with a sacrificial element 116. In the illustrated embodiment, fluid system component 114 is in the form of a circular disk and sacrificial element 116 comprises one or more grooves 118 that at least partially define the perimeter of a window or blowout patch 120. The thickness of blowout patch 120 is, in this example, substantially the same as the thickness of the periphery of disk 114. Geometric aspects of groove 118, such as the length, width, and depth of groove 118, determine the pressure at which blowout patch 120 will separate, at least partially, from disk 114, and thereby allow the flow of fluid out of production pipe 104 through window 120.

Sacrificial element 116 is generally configured to remain materially unaffected by the normal system operating pressures to which production pipe 104 may be exposed. However, sacrificial element 116 is intended to fail upon exertion, upon sacrificial element 116, of a pressure of a predetermined magnitude, or "rupture pressure." The failure of sacrificial element 116 may include the rupture of groove 118 and/or window 120. Accordingly, the thicknesses of groove 118 are window 120 are, exemplarily, determined with reference to such predetermined rupture pressure differential. Thus, when sacrificial element 116 is exposed to the rupture pressure differential, typically much greater than the pressure differential experienced by production pipe 104 during normal operating conditions, groove 118 and/or window 120 will rupture. When groove 118 ruptures, window 120 separates, at least partially, from disk 114 as shown in FIG. 4D, thereby allowing fluid to flow through disk 114.

More generally then, a "sacrificial element" refers to any structure or structural feature, or combination thereof, that is configured and intended to fail in the presence of certain predefined conditions. Examples of such predefined conditions include, but are not limited to, the attainment of a predetermined pressure differential across the sacrificial element.

As suggested by the discussion of FIGS. 2A-2D, various structural features and characteristics may be employed to create sacrificial elements that are effective in implementing the functionality discussed herein. For instance, another example of a fluid system component or disk 122 with a sacrificial element 124 is illustrated in FIGS. 4A-4C.

In particular, FIGS. 4A-4C illustrate various aspects of sacrificial element 124. As can be seen in the Figures, sacrificial element 124 includes a plurality of grooves 126 that cooperate to define the perimeter of a window or blowout patch 128. Unlike window 120, window 128 has a generally rectangular or square shape rather than circular. Additionally, grooves 126 are generally rectangular or square in shape. Similar to window 120, the thickness of window 128 is, in this example, substantially the same as the thickness of disk 122. Also like disk 114, the geometric aspects of grooves 126, such as the length, width, and depth of grooves 126, determine the pressure at which window 128 will separate, at least partially, from disk 122, and thereby allow the flow of fluid through disk 122.

FIGS. 4A-4C illustrate other exemplary embodiments of fluid system component or disk 130 with a sacrificial element 132. As with disks 114, 122, sacrificial element 132 forms a window or blowout patch 134. As shown in FIG. 4B, sacrificial element 132 takes the form of a thin window of metal, for example, configured to be fitted within or over a corresponding opening within disk 130. Alternatively, as shown in FIG. 4C, sacrificial element 132 may be a portion of disk 130 that has a thickness that is substantially less than the thickness of the rest of disk 130. In either case, window 134 may remain substantially unaffected when exposed to standard operating pressures experienced by production pipe 104. When exposed to a rupture pressure, however, window 134 may separate at least partially from disk 130 or rupture to allow fluid to flow out of production pipe 104 through disk 130.

In light of the discussion concerning FIGS. 2A-4C, it will be understood that a fluid system component according to the present invention may take a variety of forms. For instance, the configuration of a sacrificial element may include one or more grooves that define a window or blowout patch. The window or blowout patch may be circular, rectangular, square, oval, or other uniform or non-uniform shapes. The window or blowout patch may also have a thickness that is substantially the same as or significantly less than the thickness of the rest of the fluid system component. The sacrificial element may also be integrally formed with the fluid system component or the sacrificial element may be attached to form the fluid system component.

While a fluid system component according to the present invention may take any number of forms, the remainder of this description will refer to the use of fluid system component 114. It will nevertheless be appreciated that the following description will be equally applicable to any fluid system component described herein.

Fluid system component 114 may be selectively associated with production pipe 104 to selectively close off a fluid passageway defined by production pipe 104. As noted, window 120 is configured to remain materially unaffected by normal system operating conditions to which production pipe 104 may be exposed. Thus, when disk 114 is employed to pressure test production pipe 104, the fluid within production pipe 104 can be pressurized to at least the level normally encountered during production without window 120 opening. However, the exertion on sacrificial element 116 of a predetermined pressure differential that is outside the bounds of normal operating conditions experienced by production pipe 104 causes window 120 to rupture or open so that fluid within the fluid passageway of production pipe 104 flows out of production pipe 104 through window 120.

The following discussion is a more thorough presentation of the present invention and how it may be employed to pressure test production pipe 104 before installation of production pipe 104 within well casing 112. Following this discussion will be a more thorough discussion of the present invention and its use to pressure test production pipe 104 after production pipe 104 is installed within well casing 112.

As noted above, production pipe 104 is made of several individual lengths or sections of pipe 104A-N that are joined together end-to-end at joints 108A-N. It is imperative that joints 108A-N and the walls of production pipe 104 be tightly sealed so that production pipe 104 can maintain sufficient pressure to enable the effective flow of material therethrough without the material leaking out of production pipe 104. If production pipe 104 is unable to maintain the necessary pressure, due to a leaky joint 108 between two segments 104A-N, for example, then production pipe 104 needs to be repaired. As will be appreciated, it can be much more efficient to find and remedy such leaks before installing production pipe 104 in well casing 112 so as to save the time and effort of installing production pipe 104 in well casing 112, only to have to pull it out once a leak is found. Nevertheless, as discussed herein, the present invention can be employed to pressure test production pipe 104 after installation in well casing 112. Employing the present invention to pressure test an installed production pipe 104 in order to find leaks in production pipe 104 can also be more efficient than installing a pump and connecting rods in production pipe 104, only then to discover a leak, thereby requiring the removal of the pump and production pipe 104 to fix the leak. Thus, the present invention can be employed to pressure test production pipe 104 before installation in well casing 112 or after installation in well casing 112 but before installation of a pump in production pipe 104.

Figure 5C:
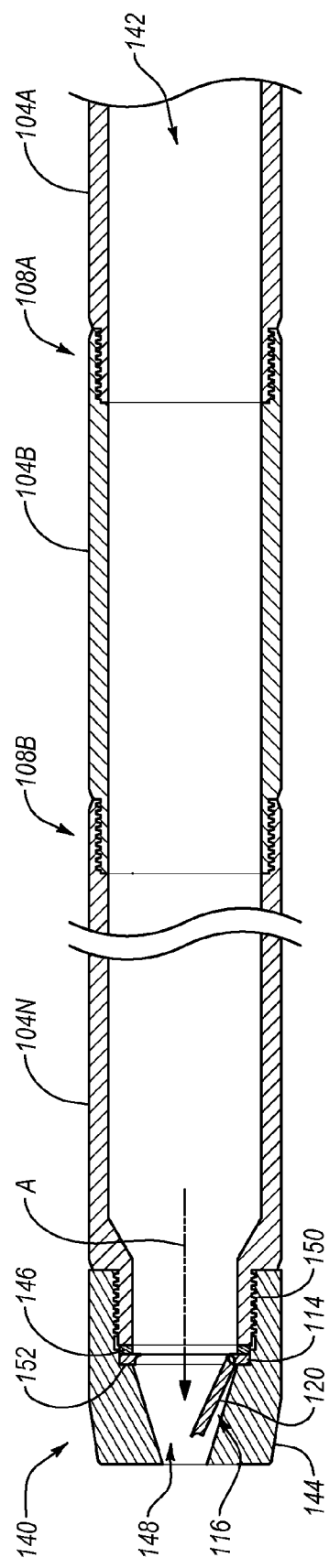

With reference to FIGS. 5A-5C, one method for performing a pre-installation pressure test of production pipe 104 will be described. Once segments 104A-N of production pipe 104 are joined together at joints 108A-N, one end of production pipe 104 is fitted with a pressure test assembly 140 that closes or seals off one end of a fluid passageway 142 within production pipe 104. Pressure test assembly 140 includes an end piece or burst disk holder 144, fluid system component 114 with sacrificial element 116, and a sealing ring 146.

As shown in FIG. 5B, end piece 144 is essentially a short pipe with a channel 148 therethrough and female threads 150 disposed within one end. End piece 144 also defines a seat 152 within channel 148 that is sized and configured to have fluid system component 114 rest thereon or positioned thereagainst when fluid system component 114 is placed in end piece 144, as shown in FIG. 5B. With fluid system component 114 placed in end piece 144, sealing ring 146 is placed in end piece 144 on the opposite side of fluid system component 114 as seat 152. With end piece 144 so loaded, pressure test assembly 140 can be secured to the end of production pipe 104 as shown in FIGS. 5A-5C. Pressure test assembly 140 seals off the end of fluid passageway 142 in production pipe 104.

With pressure test assembly 140 secured to one end of production pipe 104, the pressure testing of production pipe 104 may be performed as follows. First, fluid passageway 142 of production pipe 104 is filled with fluid, typically water, through the end of production pipe 104 that is opposite to pressure test assembly 140. The fluid is then pressurized to a predetermined level.

As discussed above, the predetermined pressure level is usually at least as high as the production pressures that production pipe 104 will encounter during use. For instance, if production pipe 104 will be exposed to production pressures of about 2100 psi, then the fluid may be pressurized to 2200 psi to make sure that production pipe 104 is able to maintain sufficient pressure. As will be appreciated by one skilled in the art, the pressure testing level may be any suitable level based on the production pressures of a particular well. Thus, if production pipe 104 will experience production pressures of about 800 psi, then production pipe 104 could be pressure tested at about 850 psi.

It will be understood that the pressure levels identified herein, whether production pressures, testing pressures, or rupture pressures, are merely exemplary levels. The present invention can be configured to test the pressure maintaining capabilities of production pipes that are used at any production pressure levels.

With the fluid in production pipe 104 pressurized to the desired testing pressure, the pressurization of the fluid is monitored for a given period of time (e.g., ten minutes) to determine whether production pipe 104 is able to maintain the pressure, or whether the pressure decays over time, indicating a leak in production pipe 104.

Once it has been determined whether production pipe 104 is able to maintain the desired pressure, and thus whether there are any leaks in production pipe 104, the pressure and fluid in production pipe 104 need to be released to allow for either the repair of any leaks in production pipe 104 or the installation of production pipe 104 in well casing 112. It is at this point that the advantageous of the present invention become more apparent. With significant amounts of pressurized fluid being held in production pipe 104, it could be very dangerous for a person to unscrew end piece 144 off of the end of production pipe 104. In particular, if a person tried to remove end piece 144 from production pipe 104 while the pressure within production pipe 104 was still very high, the pressure within production pipe 104 could cause end piece 144 and the other parts of pressure test assembly 140 to fly off, causing injury to personnel or damage to surrounding equipment.

In light of the potential dangers associated with removing end piece 144 from production pipe 104 when the fluid is still pressurized, the present invention allows for the release of the pressure without endangering personnel or equipment. In particular, once production pipe 104 as been pressure tested, the pressure within production pipe 104 can be increased from the first predetermined level (e.g., typically equal to or above normal production pressures) to a second predetermined level. The second predetermined level is higher than the first predetermined level and would be sufficient to cause sacrificial element 116 of fluid system component 114 to fail as discussed above. Specifically, the increase in pressure to the second predetermined level would cause window 120 to open or rupture as shown in FIG. 5C.

The rupturing or opening of window 120 allows the pressurized fluid in production pipe 104 to flow through window 120 as indicated by arrow A. As noted above, end piece 144 includes channel 148 to allow the fluid to pass therethrough once window 120 is opened. FIG. 5C illustrates fluid system component 114 after window 120 has been opened to allow fluid to flow therethrough. Allowing the fluid to flow out of production pipe 104 through window 120 and end piece 144 reduces the pressure within production pipe 104 and empties the fluid therefrom without the risk of end piece 144 flying off and causing injury or damage. Additionally, channel 148 within end piece 144 may be tapered as shown in FIGS. 5B-5C so that if window 120 becomes entirely separated from the rest of fluid system component 114, window 120 will be caught within channel 148 of end piece 144, Once the fluid is removed from production pipe 104, pressure test assembly 140 is be removed from production pipe 104 without disconnecting or otherwise affecting joints 108A-N between the individual sections 104A-N of production pipe 104. If production pipe 104 satisfactorily passed the pressure testing, production pipe 104 can then be fitted with a valve or pump assembly and installed in well casing 112. On the other hand, if production pipe 104 failed the pressure testing, then the leaky joints 108A-N or segments 104A-N can be repaired or replaced before installation in well casing 112. The removed pressure test assembly 140 can be dismantled and fluid system component 114 and sealing ring 146 can be discarded, while end piece 144 can be reused when testing another production pipe.

With reference to FIGS. 6A and 6B, another method for performing a pre-installation pressure test of production pipe 104 will be described. The current method is similar in many respects to the method described in connection with FIG. 5A-5C. For instance, the methods includes sealing off one end of production pipe 104 with fluid system component 114, filling production pipe 104 with fluid, pressurizing the fluid to a first level for testing, and increasing the pressure to a second level to cause sacrificial element 116 to fail to relieve the pressure and free the fluid. While the method is similar, the embodiment illustrated in FIGS. 6A and 6B include additional components that provide unique functionality.

As noted above, production pipes may include a drain component 110 or other type of pressure relief component. Such drain or pressure relief components 110 may be included as part of production pipe 104 for a number of reasons. For instance, during the life of a well, it may periodically become necessary to pull production pipe 104 from well casing 112, such as to repair production pipe 104 or other equipment (e.g., pump, valve, etc.) attached to the lower end thereof. For instance, if a valve attached to the end of production pipe 104 becomes lodged or stuck, production pipe 104 may need to be removed so that the malfunctioning valve can be repaired or replaced. If the valve is stuck closed, then pulling production pipe 104 will require lifting production pipe 104 as well as all the gas, oil, or other material that is in production pipe 104. This can be difficult as well as messy and hazardous. Some production pipes extend hundreds or thousands of feet into the ground. Hundreds or thousands of feet worth of material in a production pipe can be very heavy to lift. Furthermore, as the production pipe is pulled from the casing, these materials can spill all over the ground, creating a mess and, potentially, an environmental hazard.

Drain components have been employed in production pipes to allow for these materials to be drained from the production pipe before or as the production pipe is pulled from the well. Typically, drain components are activated or opened by increasing the pressure within the production pipe to a predetermined threshold level. Once opened, the drain component allows the material in the production pipe to flow out of the production pipe so that is does not have to be lifted to the surface.

U.S. Pat. No. 7,267,178, the disclosure of which is incorporated herein by reference, describes a unique drain component. That drain component comprises a pipe with a blow out window that can be ruptured upon the application of a certain pressure differential. In some situations that drain component has been used to relieve the fluid and pressure used to pressure test a production pipe. Once this blow out window has been ruptured, however, it becomes necessary to replace the drain component. As discussed above, replacing the drain components can be time consuming and costly.

Accordingly, the present invention allows for the inclusion of a drain component as part of the production pipe without requiring the replacement of the drain component after pressure testing the production pipe. In particular, the drain component can be attached near the end of the production pipe and the present invention can be associated with the production pipe in such a way that the blow out window of the drain component is isolated from the pressures used to test the production pipe. In other words, the present invention can seal off the drain components blow out window so that the drain component blow out window is not inadvertently ruptured during the pressure testing procedure.

In FIGS. 6A and 6B, production pipe 104 includes sections 104A-N and drain component 110 that are connected together at joints 108A-N. The Figures also illustrate an exemplary embodiment of a pressure test assembly 160, which includes a test plug 162, fluid system component 114, an end piece 164, and various sealing rings. Pressure test assembly 160 is designed to allow for the pressure testing of production pipe 104 as described above. Additionally, pressure test assembly 160 is also designed to prevent the opening or activation of drain component 110 during the pressure testing of production pipe 104.

As best seen in FIG. 6B, test plug 162 is configured to be received at least partially into production pipe 104. More specifically, test plug 162 is sized to fit within production pipe 104 so that test plug 162 spans the blow out window 166 of drain component 110. Sealing rings 168, 170 are disposed between test plug 162 and drain component 110. When production pipe 104 is filled with fluid for pressure testing, sealing rings 168, 170 prevent the fluid from passing between test plug 162 and drain component 110. As a result, when fluid is added to production pipe 104, the fluid will fill fluid passageway 172 within test plug 162 and fluid passageway 142 in production pipe 104, but the fluid will not flow between test plug 162 and drain component 110. Sealing rings 168, 170 also prevent the testing pressures within production pipe 104 from reaching blow out window 166 during the pressure testing. This prevents blow out window 166 of drain component 110 from rupturing or opening while production pipe 104 is being pressure tested.

Test plug 162 can be secured to production pipe 104 in any suitable way. For instance, as shown in FIG. 6B, test plug 162 may include exterior threads 174 that compliment interior threads 176 on drain component 110. Threads 174, 176 allow for test plug 162 to be readily secured to production pipe 104. As with joints 108A-N, test plug 162 may be secured to drain component 110 using securing means other than threaded connections.

Fluid system component 114 is positioned at the end of test plug 162 so as to cover and close off the end of fluid passageway 172. End piece 164 fits over fluid system component 114 and secures onto the end of test plug 162. End piece 164 holds fluid system component 114 in place over the end of fluid passageway 172. Similar to end piece 144, end piece 164 may be threaded onto test plug 162. Additionally, a sealing ring 178 may also be positioned between test plug 162 and fluid system component 114 to prevent fluid from leaking therebetween.

With pressure test assembly 160 so assembled and secured on the end of production pipe 104, the pressure testing of production pipe 104 may be performed in the same manner discussed above. Briefly, production pipe 104 is filled with fluid, the fluid is pressurized to a first predetermined level, and the pressure decay is monitored to detect any leaks in production pipe 104. Once the pressure test is complete, the pressure within production pipe 104 can be increased to a rupture pressure to cause sacrificial element 116 to fail and window 120 to open to release the pressure and fluid from production pipe 104.

As can be seen in FIG. 6B, rather than having a tapered channel like end piece 144 to catch window 120, end piece 164 has a relatively straight channel 180 with cross-bars 182, 184 mounted therein. Cross-bars 182, 184 are designed to catch sacrificial element 116 within channel 180 of end piece 164 if sacrificial element 116 becomes entirely separated from the rest of fluid system component 114. As can be seen in FIG. 6B, cross-bars 182, 184 can be angled to prevent sacrificial element from blocking channel 180 and preventing the fluid from flowing therethrough.

Once the pressure testing is complete and the fluid is removed from production pipe 104, pressure test assembly 160 is be removed from production pipe 104 without disconnecting or otherwise affecting joints 108A-N between the individual sections 104A-N of production pipe 104 or compromising drain component 110. Removal of pressure test assembly 160 also exposes the internal surface of drain component 110. Drain component 110 can then be used at a later time to drain production pipe 104 before pulling production pipe 104 from well casing 112.

If production pipe 104 satisfactorily passed the pressure testing, production pipe 104 can then be fitted with a valve or pump assembly and installed in well casing 112. On the other hand, if production pipe 104 failed the pressure testing, then the leaky joints 108A-N or segments 104A-N can be repaired or replaced before installation in well casing 112. The removed pressure test assembly 160 can be dismantled and fluid system component 114 and sealing rings 168, 170, 178 can be discarded, while test plug 162 and end piece 164 can be reused when testing another production pipe.

While pressure test assembly 160 has been shown and described as being used in connection with a production pipe that includes a drain component, it will be understood that pressure test assembly 160 may be used in connection with a production pipe regardless of whether the production pipe includes a drain component. For instance, test plug 162 may be inserted into a segment 104A-N of production pipe 104 that does not include a blow out window that needs to be isolated from the pressure testing.

Figure 7A:
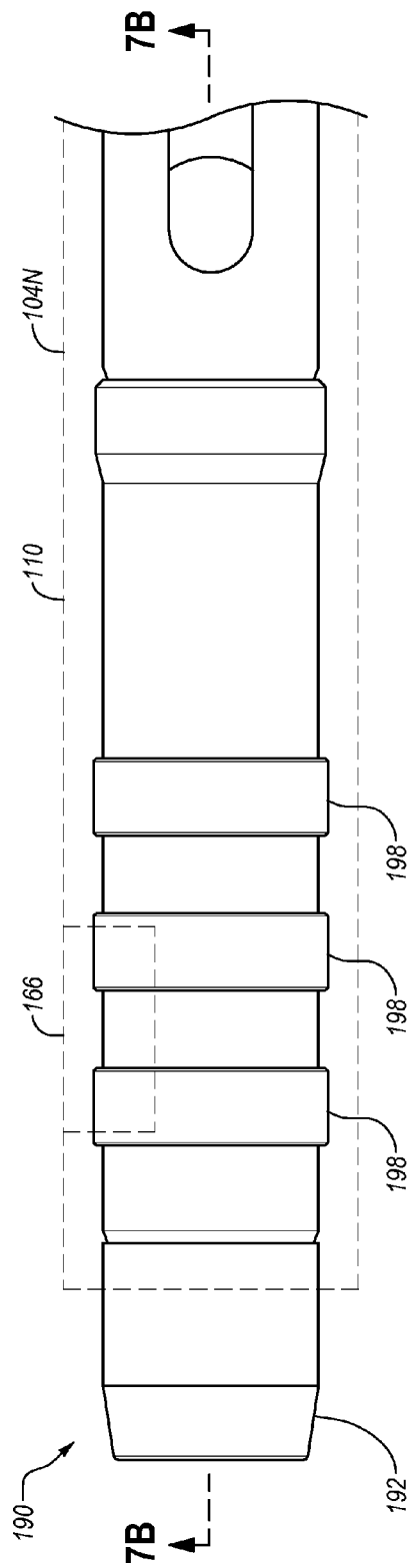
FIGS. 7A and 7B illustrate elevation and cross-sectional views of still another exemplary embodiment of a pressure test assembly associated with a production pipe.
Figure 7B:
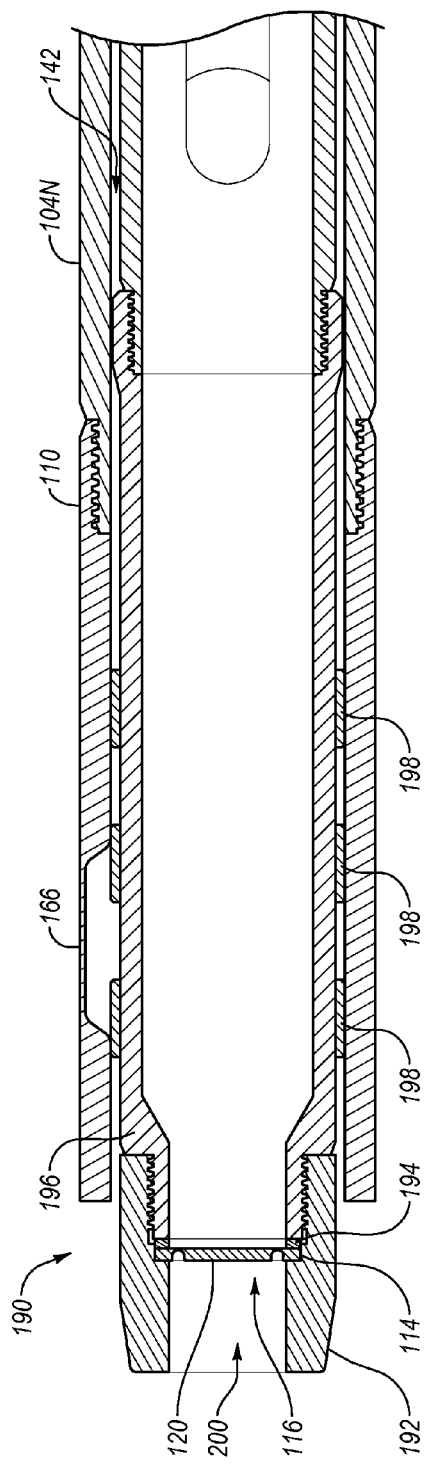

Turning now to FIGS. 7A and 7B, a pressure test assembly 190 for use in pressure testing a production pipe 104 (shown in phantom in FIG. 7A) that is already installed in well casing 112 is illustrated. Pressure test assembly 190 may be designed for use in connection with a production pipe 104 that includes drain component 110 or a production pipe 104 that does not include drain component 110, or with both types of production pipes. Regardless, a testing procedure similar to that described above may be used to test a production pipe that has already been installed in a well casing. That is, the pressure test assembly is inserted into the production pipe and secured in place at the lower end of the production pipe, the production pipe is filled with fluid, the fluid is pressurized, pressure decay is monitored, and, when testing is complete, the fluid system component 114 is ruptured to relieve the pressure and fluid from the production pipe. While this same general procedure is followed, there are, however, some differences and additional benefits of the present invention when used to test a pre-installed production pipe.

Currently, pre-installed production pipes are pressure tested according to the following generalized manner. The production pipe is assembled with some sort of drain component secured near the lower end of the production pipe, as discussed above. As with the above-described testing procedure, the production pipe is filled with a fluid (e.g., water). The fluid is then pressurized and the pressure decay is monitored to determine whether any leaks exist in the production pipe. Once the testing is complete, the pressure within the production pipe is increased sufficiently to cause the drain component to open, thereby allowing the fluid within the production pipe to flow out. Once the drain component has been opened, the production pipe is pulled from the well casing. The opened drain component is removed from the production pipe and replaced with a new drain component. With the new drain component attached, the production pipe is then re-installed in the well casing and production begins again.

As will be appreciated, the process of installing, testing, removing, and re-installing the production pipe is extremely inefficient. Use of the present invention to test a pre-installed production pipe removes the need to pull the whole production pipe from the well casing in order to replace an opened drain component. Rather, as discussed below, the present invention allows for the production pipe to be tested within the well casing without having to pull the production pipe when the testing is complete, thereby reducing the time and effort it takes to test a production pipe and begin production once the test is complete.

According to the present invention, and with reference to FIGS. 7A-7B, a pre-installed production pipe 104 can be pressure tested as follows. A pressure test assembly 190 is assembled. In particular, an end piece 192 receives fluid system component 114 and a sealing ring 194 therein. End piece 192 is then threaded or otherwise attached to a test plug 196 as shown in FIG. 7B. Pressure test assembly 190, including end piece 192 and test plug 196, is sized to fit through fluid passageway 142 in production pipe 104.

Once assembled, pressure test assembly 190 is inserted into the end of production pipe 104 near the surface of the ground and lowered to the bottom end of production pipe 104. Pressure test assembly 190 may be fitted into a pump seating nipple at the end of production pipe 104, thereby sealing off the lower end of production pipe 104. Additionally, or as an alternative, test plug 196 may have one or more sealing rings 198 positioned therearound to create a seal between pressure test assembly 190 and the interior surface of fluid passageway 142.

With pressure test assembly 190 positioned within and sealing off the lower end of production pipe 104, production pipe 104 is filled with fluid, typically up to the top most point of production pipe 104. The fluid within production pipe 104 is then pressurized to at least the production pressure as discussed herein. The pressure decay is monitored to determine if there are any leaks in production pipe 104.

After the pressure testing is complete, the pressure within production pipe 104 can be increased sufficiently (e.g., to a rupture pressure) to cause sacrificial element 116 to fail so that window 120 of fluid system component 114 opens or ruptures. The opening of window 120 allows the fluid to flow out of production pipe 104 and into the ground or well casing 112. Pressure test assembly 190 is then pulled from production pipe 104. If production pipe 104 passed the pressure test, then a pump or valve assembly is lowered through production pipe 104 into the pump seating nipple and production is started. As will be understood, it is much faster and easier to insert and remove pressure test assembly 190 rather than pulling the whole production pipe 104, replacing the opened drain component 110, and re-installing production pipe 104. Thus, the present invention provides significant advantages over the current pressure testing procedures and related devices.

Like pressure test assembly 160, pressure test assembly 190 can also be used in connection with a production pipe 104 that includes a drain component 110. Pressure test assembly 160 may be able to isolate a blowout window 166 on drain component 110 so that blow out window 166 is not exposed to the testing pressure or rupture pressures associated with the pressure testing of production pipe 104.

Accordingly, pressure test assembly 190 allows for the inclusion of drain component 110 as part of production pipe 104 without requiring the replacement of drain component 110 after pressure testing production pipe 104. In particular, drain component 110 can be attached near the end of production pipe 104 and pressure test assembly 190 can be inserted into production pipe 104 inside drain component 110 as shown in FIG. 7B. Pressure test assembly 190 can seal off blow out window 166 of drain component 110 so that blow out window 166 is not inadvertently ruptured during the pressure testing procedure.

Similar to pressure test assembly 160, sealing rings 198 of pressure test assembly 190 may create a seal between test plug 196 and drain component 110. The seal provided by sealing rings 198 may prevent the pressure used to test production pipe 104 from activating drain component 110. As a result of the seal between test plug 196 and drain component 110, the pressure used to pressure test production pipe 104 is maintained within production pipe 104 and test plug 196.

As described above, during pressure testing, the pressure within the production pipe is monitored to detect leaks. Once the testing is complete, the pressure is increased so as to open window 120 of fluid system component 114. Opening window 120 allows the fluid within production pipe 104 to flow through channel 200 in end piece and into the ground or well casing. Similar to end pieces 144, 164, end piece 192 can have a tapered channel and/or cross-bars mounted therein to catch a separated window 120.

Once pressure testing is complete and window 120 of fluid system component 114 has been opened, pressure test assembly 190 can be pulled from production pipe 104, thereby exposing the internal surface of drain component 110. Drain component 110 can then be used at a later time to drain production pipe 104 before pulling production pipe 104 from well casing 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid system comprising:
a test plug adapted to be received at least partially within a fluid conduit having (i) a drain component with a blow out window and (ii) a fluid passageway therethrough that extends from a first end of the fluid conduit to a second end of the fluid conduit, the test plug being adapted to substantially isolate the drain component blow out window from a pressure within the fluid conduit when the test plug is received at least partially within the first end of the fluid conduit; and
a disk that can be directly or indirectly secured at the first end of the fluid conduit, the disk being configured to selectively close off the fluid passageway and prevent the flow of fluid out of the first end of the fluid conduit when a pressure within the fluid conduit is below a predetermined level, wherein the disk comprises a sacrificial element that is adapted for preferential failure when the pressure within the fluid conduit exceeds the predetermined level.

2. The fluid system of claim 1, wherein the sacrificial element comprises a window defined by one or more grooves formed in a surface of the disk.

3. The fluid system of claim 2, wherein the window is generally circular.

4. The fluid system of claim 2, wherein the window is generally rectangular.

5. The fluid system of claim 1, wherein the disk is received within an end piece that can be secured onto the first end of the fluid conduit.

6. The fluid system of claim 5, wherein the end piece comprises a seat for receiving the disc therein.

7. A pressure test assembly comprising:
a test plug adapted to be received at least partially within a fluid conduit having (i) a drain component with a blow out window and (ii) a fluid passageway therethrough that extends from a first end of the fluid conduit to a second end of the fluid conduit, the test plug having a fluid passageway extending therethrough, the test plug being adapted to substantially isolate the drain component blow out window from a pressure within the fluid conduit when the test plug is received at least partially within the first end of the fluid conduit;
an end piece adapted to be selectively secured to the test plug, the end piece having a channel extending therethrough; and
a fluid system component securable between the test plug and the end piece such that the fluid system component selectively seals off the fluid passageway, the fluid system component having a sacrificial element that (i) seals off the end of the fluid passageway and prevents fluid communication between the fluid passageway in the test plug and the channel in the end piece when a pressure within the fluid conduit is below a predetermined pressure level, and (ii) opens to allow for fluid communication between the fluid passageway in the test plug and the channel in the end piece when a pressure within the fluid conduit is above the predetermined pressure level.

8. The pressure test assembly of claim 7, wherein the test plug sealingly engages an interior surface of the fluid conduit.

9. The pressure test assembly of claim 7, wherein the test plug is adapted to be threadably connected to the fluid conduit.

10. The pressure test assembly of claim 7, wherein the fluid system component comprises a disk having one or more grooves formed therein to define a window.

11. The pressure test assembly of claim 10, wherein the one or more grooves rupture when a pressure within the fluid conduit is above the predetermined pressure level, thereby opening the window in the fluid system component.

12. The pressure test assembly of claim 7, wherein the pressure test assembly is sized to be passed through the fluid conduit between the first end and the second end.

13. The pressure test assembly of claim 7, wherein the end piece comprises a seat for receiving the fluid system component therein.

14. The pressure test assembly of claim 7, wherein the end piece comprises a catch mechanism for catching the sacrificial element.

15. The pressure test assembly of claim 14, wherein the catch mechanism comprises a set of cross-bars.

16. A fluid system comprising:
a fluid conduit comprising a plurality of tubing sections joined together end-to-end, the fluid conduit having a fluid passageway extending therethrough between a first end and a second end, the fluid conduit comprising a drain component having a blow out window;

a test plug adapted to be received at least partially within the first end of the fluid conduit, the test plug having a fluid passageway extending therethrough, wherein the test plug substantially isolates the drain component blow out window from a pressure within the fluid conduit when the test plug is received at least partially within the first end of the fluid conduit;

an end piece adapted to be selectively coupled to the test plug, the end piece having a channel extending therethrough; and a fluid system component securable between the first end of the fluid conduit and the end piece to close the first end of the fluid conduit and prevent the flow of fluid between the fluid passageway of the fluid conduit and the channel of the end piece when a pressure within the fluid conduit is below a predetermined level, the fluid system component comprising a sacrificial element that is adapted for preferential failure when the pressure within the fluid conduit exceeds the predetermined level.

17. The fluid system of claim 16, further comprising one or more seals disposed between the test plug and the fluid conduit.

18. The fluid system of claim 16, wherein the fluid system component is selectively securable between the end piece and the test plug.

19. The fluid system of claim 18, further comprising a seal disposed between the fluid system component and the test plug component blow out window from the pressure within the fluid conduit when the test plug is received at least partially within the first end of the fluid conduit.

20. The fluid system of claim 16, wherein the test plug is adapted to be passed through the fluid passageway between the first and second ends of the fluid conduit.

21. The fluid system of claim 16, wherein the end piece comprises a catch mechanism that prevents the sacrificial element from blocking fluid flow through the channel in the end piece after preferential failure of the sacrificial element.

* * * * *